US011695597B2

(12) United States Patent
Harada et al.

(10) Patent No.: US 11,695,597 B2
(45) Date of Patent: Jul. 4, 2023

(54) TERMINAL

(71) Applicant: NTT DOCOMO, INC., Tokyo (JP)

(72) Inventors: Hiroki Harada, Tokyo (JP); Satoshi Nagata, Tokyo (JP); Shaozhen Guo, Beijing (CN); Jing Wang, Beijing (CN); Xin Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/597,663

(22) PCT Filed: Jul. 18, 2019

(86) PCT No.: PCT/JP2019/028325
§ 371 (c)(1),
(2) Date: Jan. 17, 2022

(87) PCT Pub. No.: WO2021/009919
PCT Pub. Date: Jan. 21, 2021

(65) Prior Publication Data
US 2022/0286330 A1    Sep. 8, 2022

(51) Int. Cl.
*H04L 25/03* (2006.01)
*H04L 27/26* (2006.01)

(52) U.S. Cl.
CPC .. *H04L 25/03834* (2013.01); *H04L 25/03159* (2013.01); *H04L 25/03343* (2013.01); *H04L 27/26025* (2021.01)

(58) Field of Classification Search
CPC ......... H04L 25/03834; H04L 25/03828; H04L 27/2602; H04L 27/26025; H04L 27/2603; H04L 27/2604; H04L 27/26035; H04L 25/03159; H04L 25/03012; H04L 25/03006; H04L 25/03343; H04L 2025/0335
See application file for complete search history.

(56) References Cited

U.S. PATENT DOCUMENTS

| | | | |
|---|---|---|---|
| 2013/0028186 A1* | 1/2013 | Kim | H04B 7/0695 370/328 |
| 2014/0169276 A1* | 6/2014 | Choi | H04L 1/06 370/328 |
| 2017/0156108 A1* | 6/2017 | Kim | H04W 36/0088 |
| 2018/0206129 A1* | 7/2018 | Choi | H04W 74/0808 |
| 2018/0359123 A1 | 12/2018 | Kimura et al. | |

(Continued)

FOREIGN PATENT DOCUMENTS

| | | |
|---|---|---|
| WO | 2017/115609 A1 | 7/2017 |
| WO | 2019/065459 A1 | 4/2019 |

OTHER PUBLICATIONS

3GPP TS 38.211 V15.6.0; "3rd Generation Partnership Project; Technical Specification Group Radio Access Network; NR; Physical channels and modulation (Release 15)"; Jun. 2019 (97 pages).

(Continued)

*Primary Examiner* — Khanh C Tran
(74) *Attorney, Agent, or Firm* — Osha Bergman Watanabe & Burton LLP

(57) ABSTRACT

A terminal receives a slot that includes a plurality of symbols. The terminal determines the number of symbols included in a sub-frame on the basis of a time length of the symbol.

9 Claims, 12 Drawing Sheets

(56) References Cited

U.S. PATENT DOCUMENTS

2020/0236574 A1    7/2020  Ohuchi et al.
2021/0235420 A1*   7/2021  Kim .................... H04W 72/20

OTHER PUBLICATIONS

H. Lin et al; "An Efficient FTN Implementation of the OFDM/OQAM System"; 2015 IEEE International Conference on Communication (ICC), pp. 4787-4792; Sep. 10, 2015 (6 pages).
3GPP TR 38.807 V0.1.0; "3rd Generation Partnership Project; Technical Specification Group Radio Access Network; Study on requirements for NR beyond 52.6 GHz (Release 16)"; Mar. 2019 (43 pages).
International Search Report for corresponding International Application No. PCT/JP2019/028325, dated Feb. 4, 2020 (5 pages).
Written Opinion for corresponding International Application No. PCT/JP2019/028325, dated Feb. 4, 2020 (3 pages).

* cited by examiner

/ TERMINAL

TECHNICAL FIELD

The present invention relates to a terminal that performs radio communication, and particularly relates to a terminal that supports Faster-Than-Nyquist (FTN) transmission.

BACKGROUND ART

The 3rd Generation Partnership Project (3GPP) specifies Long Term Evolution (LTE), and with the aim of further speeding, specifies LTE-Advanced (hereinbelow, the LTE includes the LTE-Advanced). Further, specifications for 5th generation mobile communication system (5G, also called as New Radio (NR) or Next Generation (NG)) are also being considered.

In Release 15 (NR) of the 3GPP, it has been stipulated that a radio frame (10 ms) includes a plurality of sub frames, and a slot includes 14 symbols (Non-Patent Document 1)

Moreover, the current specifications of the NR are based on a Nyquist rate, and do not support the Faster-Than-Nyquist (FTN) transmission. In the FTN, because a symbol is multiplexed at a rate faster than the Nyquist rate, it is possible to improve a spectral efficiency as compared to that in the Nyquist rate transmission (Non-Patent Document 2).

Specifically, the FTN allows an inter-symbol interference (ISI: Inter-Symbol Interference) and an inter-subcarrier interference (Inter-subCarrier Interference), and improves the spectral efficiency by multiplexing a symbol to a high density.

Furthermore, in Release 15 and Release 16 of the 3GPP, specifications for an operation of a band including FR1 (410 MHz to 7.125 GHz) and FR2 (24.25 GHz to 52.6 GHz) have been created. Moreover, in specifications from Release 16 onward, an operation in a band above 52.6 GHz has been studied (refer to Non-Patent Document 3). A target frequency range in Study Item (SI) is 52.6 GH to 114.25 GHz.

PRIOR ART DOCUMENT

Non-Patent Document

Non-Patent Document 1: 3GPP TS 38.211 V15.6.0, 3rd Generation Partnership Project; Technical Specification Group Radio Access Network; NR; Physical channels and modulation (Release 15), 3GPP, June 2019
Non-Patent Document 2: H. Lin, N. Lahbabi, P. Siohan and X. Jiang, "An efficient FTN implementation of the OFDM/OQAM system", 2015 IEEE International Conference on Communications (ICC), London, 2015, pp. 4787-4792
Non-Patent Document 3: 3GPP TR 38.807 V0.1.0, 3rd Generation Partnership Project; Technical Specification Group Radio Access Network; Study on requirements for NR beyond 52.6 GHz (Release 16), 3GPP, March 2019

SUMMARY OF THE INVENTION

However, in a case of using a different frequency band differing from FR1/FR2 such as a high frequency band above 52.6 GHz, an increase in a transmission loss, and a phase noise become a problem. Moreover, it becomes more sensitive to nonlinearity of a power amplifier and peak-to-average power ratio (PAPR).

When such problems are taken into consideration, combining the FTN and Discrete Fourier Transform-Spread OFDM (DFT-S-OFDM) may be possible. Accordingly, it is possible to improve the PAPR while achieving a spectral efficiency equivalent to Cyclic Prefix-Orthogonal Frequency Division Multiplexing (CP-OFDM).

Whereas, in a case of applying the FTN, there is a possibility that an appropriate symbol length (time length of a symbol) differs from that in a case of Nyquist transmission. Moreover, there is also a possibility that an applicability of the FTN to a downlink (DL) and an uplink (UL) differs.

In such case, a case in which the current NR radio frame configuration is not necessarily appropriate is envisaged.

The present invention has been made in view of such circumstances, and one object of the present invention is to provide a terminal that is capable of using an appropriate radio frame configuration even in a case in which the Faster-Than-Nyquist (FTN) is applied.

According to one aspect of the present disclosure a terminal (UE 200) includes a transmitting and receiving unit (FTN modulation module and FTN demodulation module) that transmits and receives a slot including a plurality of symbols; and a control unit that determines number of symbols included in a sub-frame on the basis of a time length of the symbol.

MODES FOR CARRYING OUT THE INVENTION

Figure 1:
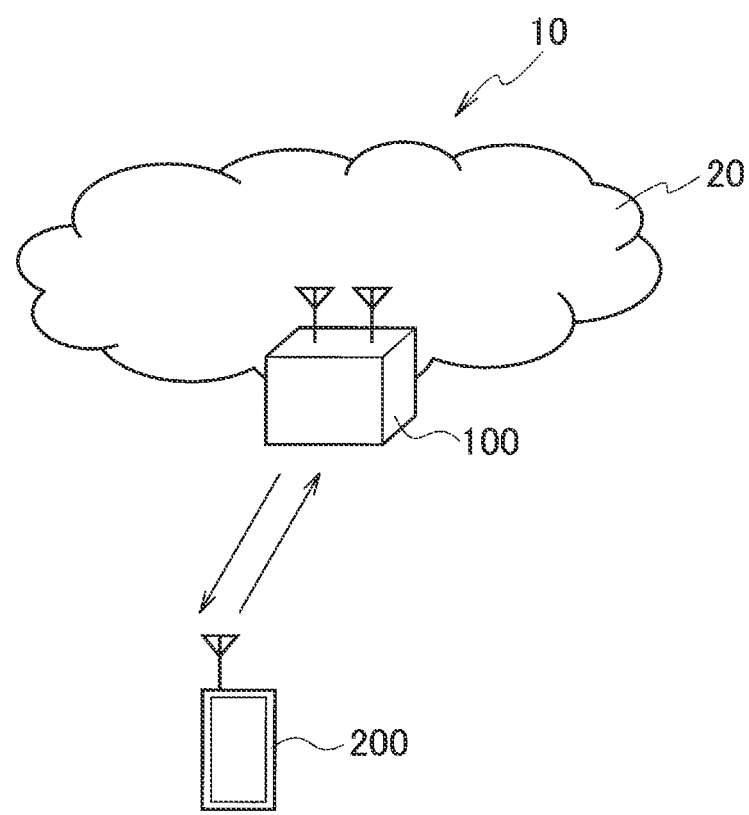
FIG. 1 is an overall schematic configuration diagram of a radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G New Radio (NR). The radio communication system 10 includes Next Generation-Radio Access Network 20 (hereinafter, "NG-RAN 20") and a terminal 200 (hereinafter, "UE 200", "User Equipment").

The NG-RAN 20 includes a radio base station 100 (hereinafter, "gNB 100"). A concrete configuration of the radio communication system 10, including the number of the gNBs and the UEs, is not limited to the example shown in FIG. 1.

The NG-RAN 20 actually includes a plurality of NG-RAN Nodes, in particular, the gNBs (or ng-eNB). Also, the NG-RAN 20 is connected to a core network (5GC, not shown) according to the 5G. The NG-RAN 20 and the 5GC may be simply expressed as "network".

The gNB 100 is a radio base station according to the 5G. The gNB 100 performs a radio communication with the UE 200 according to the 5G. The gNB 100 and the UE 200 can handle, by controlling a radio signal transmitted from a plurality of antenna elements, Massive MIMO (Multiple-Input Multiple-Output) that generates a beam with a higher directivity, carrier aggregation (CA) that bundles a plurality of component carriers (CC) to use, dual connectivity (DC) in which communication is performed simultaneously between two NG-RAN Nodes and the UE, and the like. The radio communication system 10 corresponds to FR1 and FR2.

The frequency band of each FR is as below.
FR1: 410 MHz to 7.125 GHz
FR2: 24.25 GHz to 52.6 GHz In FR1, Sub-Carrier Spacing (SCS) of 15 kHz, 30 kHz, or 60 kHz is used, and a bandwidth (BW) of 5 MHz to 100 MHz is used. FR2 is a higher frequency than FR1. Moreover, FR2 uses SCS of 60 kHz or 120 kHz (240 kHz may be included), and uses a bandwidth (BW) of 50 MHz to 400 MHz.

Note that SCS may be interpreted as numerology. The numerology is defined in 3GPP T538.300 and corresponds to one subcarrier spacing in the frequency domain.

Furthermore, the radio communication system 10 can handle a frequency band that is higher than the frequency band of FR2. Specifically, the radio communication system 10 can handle a frequency band exceeding 52.6 GHz and up to 114.25 GHz. Here, such a high frequency band is referred to as "FR4" for convenience. FR4 belongs to so-called EHF (extremely high frequency, also called millimeter wave). FR4 is a temporary name and may be called by another name.

FR4 may be further classified. For example, FR4 may be divided into a frequency range of 70 GHz or less and a frequency range of 70 GHz or more. Alternatively, FR4 may be divided into more frequency ranges, and may be divided in frequencies other than 70 GHz.

Here, the frequency band between FR2 and FR1 is referred to as "FR3" for convenience. FR3 is a frequency band above 7.125 GHz and below 24.25 GHz.

In the present embodiment, FR3 and FR4 are different from the frequency band including FR1 and FR2, and may be called different frequency bands.

Particularly, as described above, in a high frequency band such as FR4, an increase in phase noise between carriers becomes a problem. This may require application of a larger (wider) SCS or a single carrier waveform.

Also, a narrower beam (i.e., a larger number of beams) may be required due to increased propagation loss. In addition, since it is more sensitive to PAPR and power amplifier nonlinearity, a greater (wider) SCS (and/or fewer FFT points), a PAPR reduction mechanism, or a single carrier waveform may be required.

In order to address these issues, in this embodiment, particularly, when using a band exceeding 52.6 GHz, Cyclic Prefix-Orthogonal Frequency Division Multiplexing (CP-OFDM) or Discrete Fourier Transform Spread (DFT-S-OFDM) having a larger Sub-Carrier Spacing (SCS) can be applied.

Moreover, in the radio communication system 10, it is possible to support Faster-Than-Nyquist (FTN) transmission. In the FTN, because a symbol (specifically, an OFDM symbol, appropriately abbreviated as "symbol") is multiplexed at a rate faster than the Nyquist rate, it is possible to improve the spectral efficiency as compared to the Nyquist transmission.

The FTN allows an inter-symbol interference (ISI: Inter-Symbol Interference) and an inter-subcarrier interference (Inter-subCarrier Interference), and improves the spectral efficiency by multiplexing the OFDM symbol to a high density. The spectral efficiency may be simply called as a usage efficiency, or may be called as Spectral Efficiency (SE) and the like.

Figure 2:
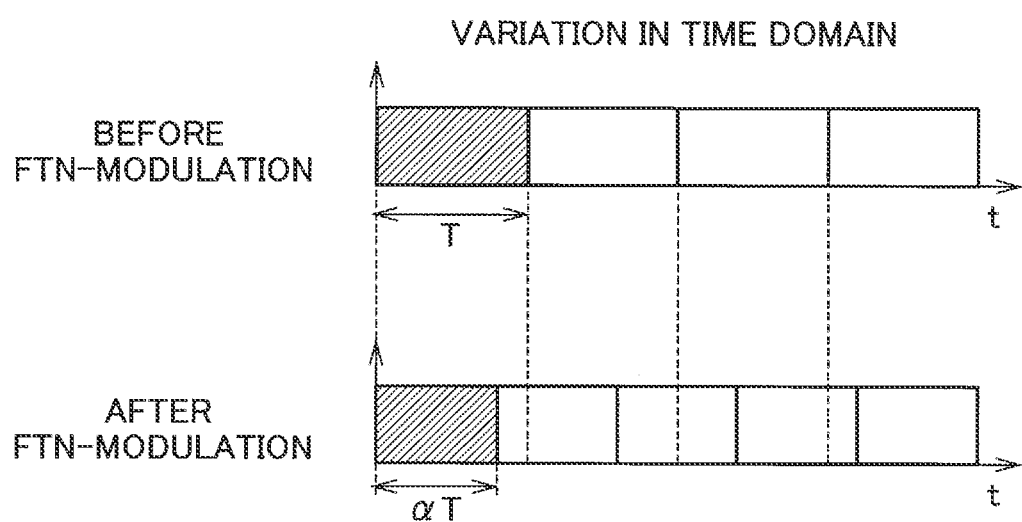
FIG. 2 is a diagram illustrating a variation in a time domain in a combination of FTN and DFT-S-OFDM.
Figure 3:
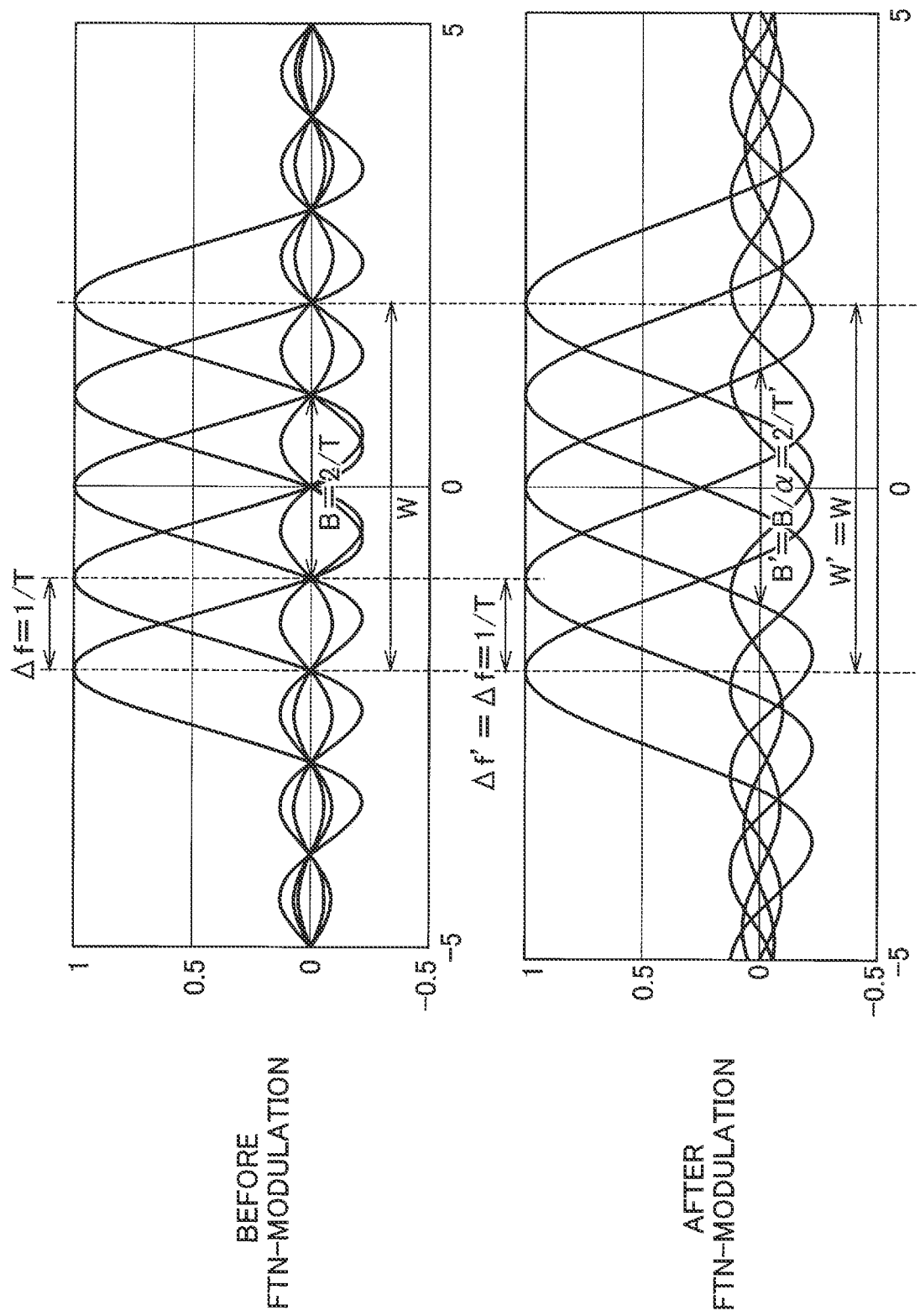
FIG. 3 is a diagram illustrating a variation in a frequency domain in the combination of the FTN and the DFT-S-OFDM.

FIG. 2 illustrates a variation in a time domain in a combination of the FTN and a DFT-S-OFDM. Moreover, FIG. 3 shows a variation in a frequency domain in the combination of the FTN and the DFT-S-OFDM.

A non-orthogonal subcarrier can be expressed as follows.

subcarrier interval ($\Delta f$)×OFDM symbol ($T$)=$\alpha$<1$s$

Here, $\alpha$ is called as FTN modulation factor. As shown in FIG. 2, when 'before FTN-modulation' and 'after FTN-modulation' are compared, in the 'after FTN-modulation', a symbol length of the OFDM symbol is subjected to scaling by the FTN modulation factor $\alpha$. Note that, a may also be called as Squeezing factor and the like.

Specifically, the signal length becomes shorter than that 'before FTN-modulation', that is, when compared with the 'before FTN-modulation', the OFDM symbol is squeezed in a time direction. The degree of squeezing can be controlled by $\alpha$.

Note that, the symbol length may also be called as time length of symbol, symbol length, symbol period, symbol time, or the like.

Moreover, as shown in FIG. 3, a subcarrier bandwidth (B') of 'after FTN-modulation' is, $\alpha$, that is, is practically extended by the OFDM symbol squeezed in the time direction, and transmission at even faster rate is possible.

In such manner, in a case in which the FTN that performs squeezing of a time domain in the OFDM, the OFDM symbol of each subcarrier is multiplexed at a rate faster than the Nyquist rate. Accordingly, it is possible to facilitate improvement of the throughput (communication capacity). Table 1 shows an example of FTN limit value (FTN limit) and a rate growth (Rate growth) corresponding to a modulation order (modulation system) (Reference, Non-Patent Document 2).

TABLE 1

|       | FTN limit | Rate growth |
|-------|-----------|-------------|
| QPSK  | 0.5       | 2           |
| 16QAM | 0.7       | 1.43        |
| 64QAM | 0.9       | 1.11        |

As shown in Table 1, irrespective of the modulation order (modulation system), it is possible to improve the throughput according to the FTN. The FTN limit value (FTN limit) is FTN modulation factor (a) for which no degradation of a bit error rate (BER) occurs, and as the modulation order becomes higher, the efficiency is degraded. That is, the maximum gain (rate growth) of the FTN for which no BER degradation occurs, becomes lower as the modulation order becomes higher.

For instance, in Quadrature Phase Shift Keying (QPSK), the FTN limit is 0.5, and the OFDM symbol is squeezed to a time length half of that before the FTN modulation. Accordingly, the rate rises up to twofold.

When such characteristic of the FTN is taken into consideration, in a case in which the spectral efficiency (SE) and the modulation order are same, for example, the FTN transmission due to a low coding rate can be said to exert BER characteristic superior to that in the Nyquist transmission due to a high coding rate.

Moreover, in a case in which the modulation order and the coding rate are fixed, the FTN transmission can be said to be able to achieve even higher SE while allowing an increase in the BER to some extent.

Furthermore, in a case in which the modulation order is fixed and the coding rate differs, the FTN transmission can be said to be able to achieve both of high SE and low BER by adjusting the FTN modulation factor ($\alpha$) and the coding rate.

(2) Functional Block Configuration of Radio Communication System

A functional block configuration of the radio communication system 10 will be explained below. Specifically, a functional block configuration of the gNB 100 and the UE 200 will be described below.

Figure 4:
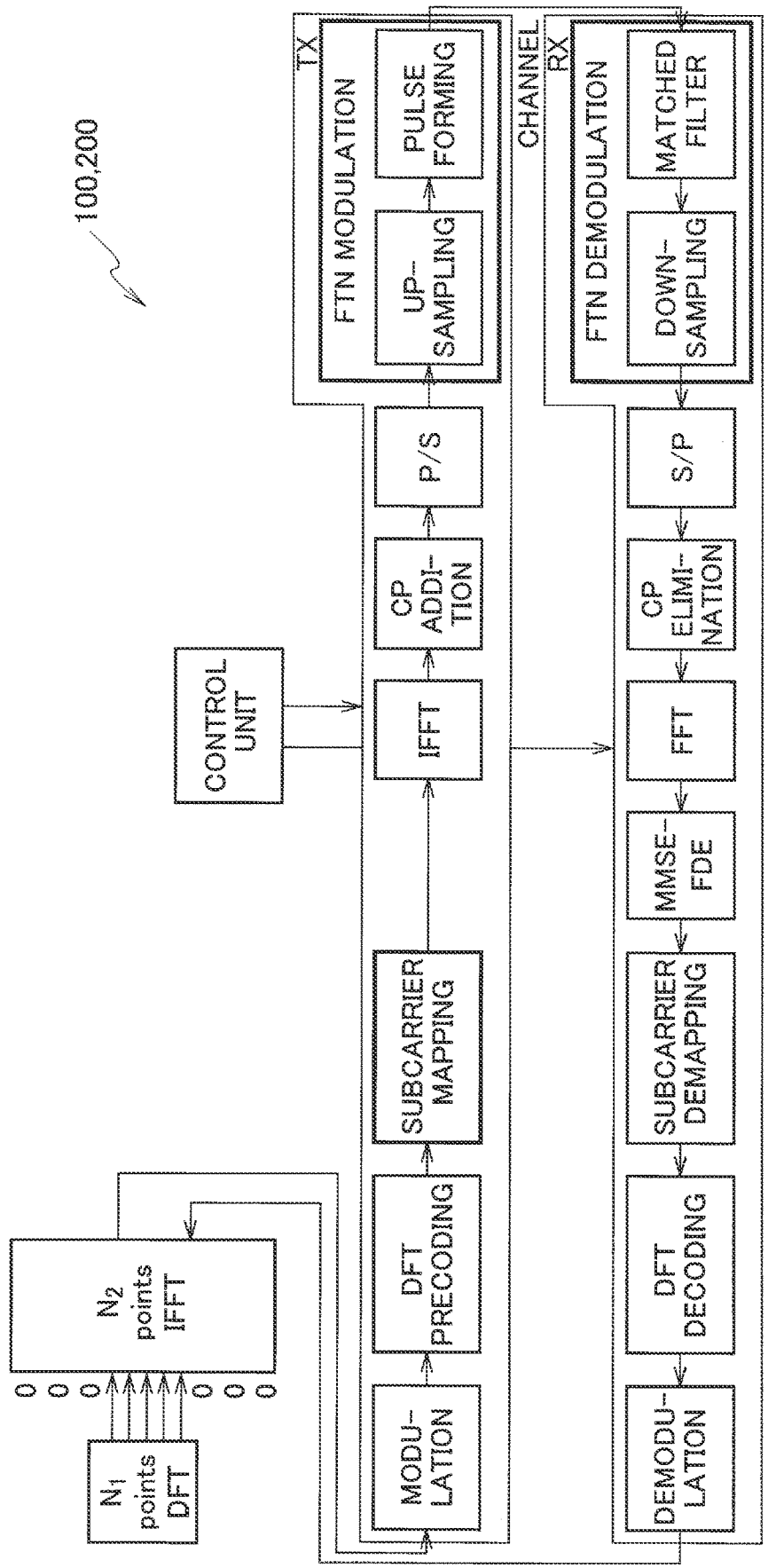
FIG. 4 is schematic functional block diagram of gNB 100 and UE 200.
Figure 5:
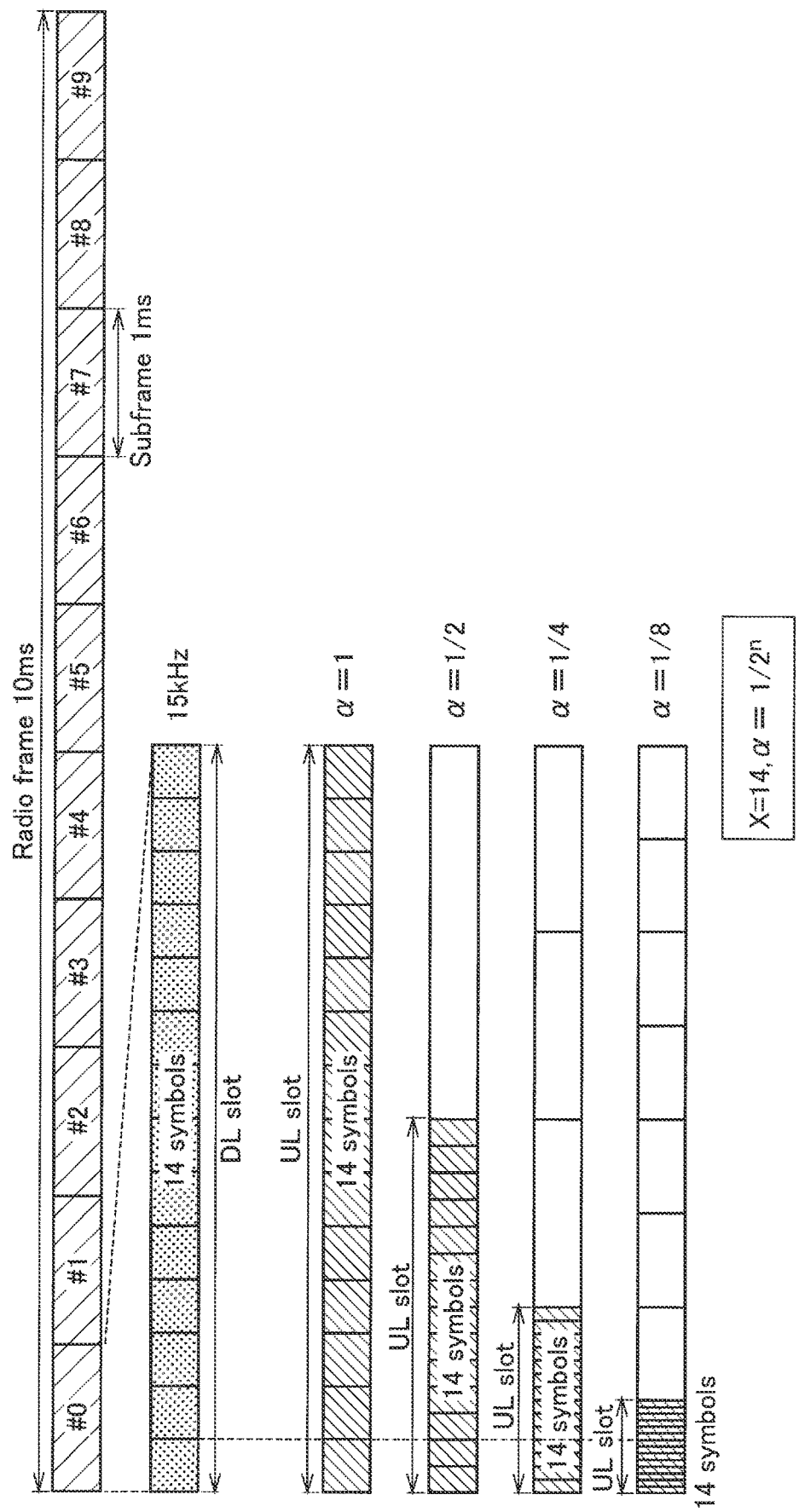
FIG. 5 is a diagram illustrating a configuration example 1-1 of a radio frame.
Figure 6:
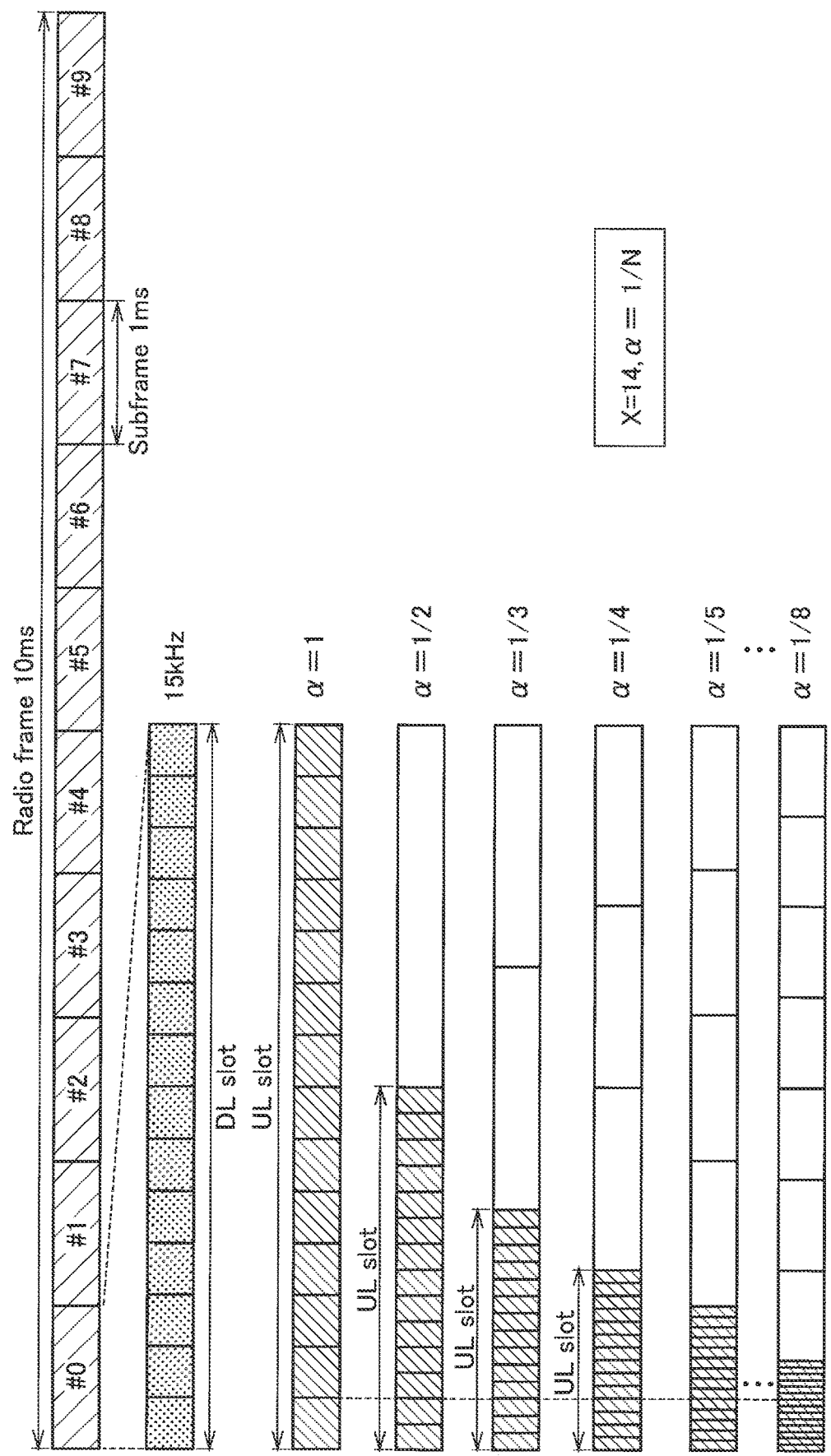
FIG. 6 is a diagram illustrating a configuration example 1-2 of the radio frame.
Figure 7:
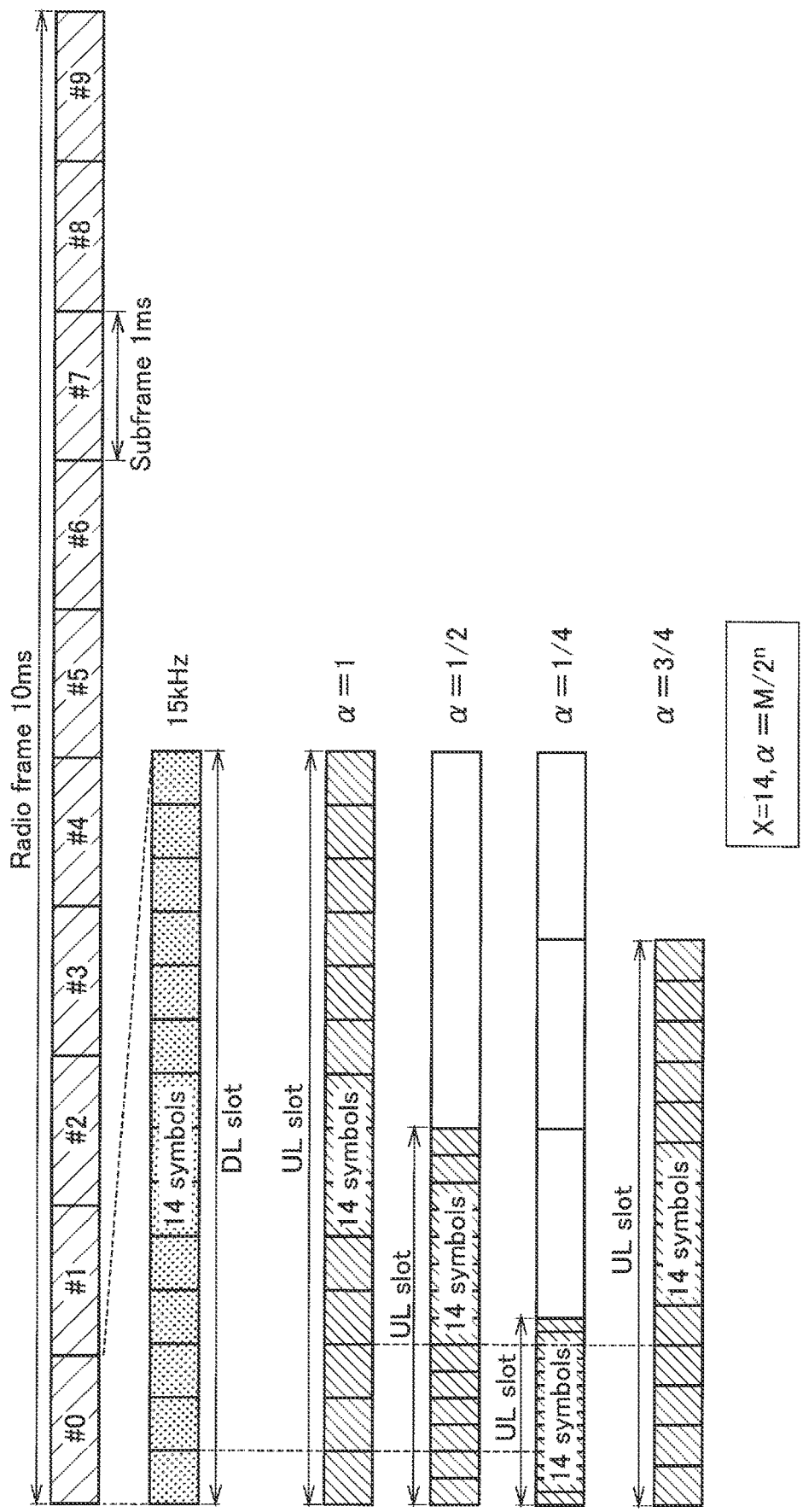
FIG. 7 is a diagram illustrating a configuration example 1-3 of the radio frame.
Figure 8:
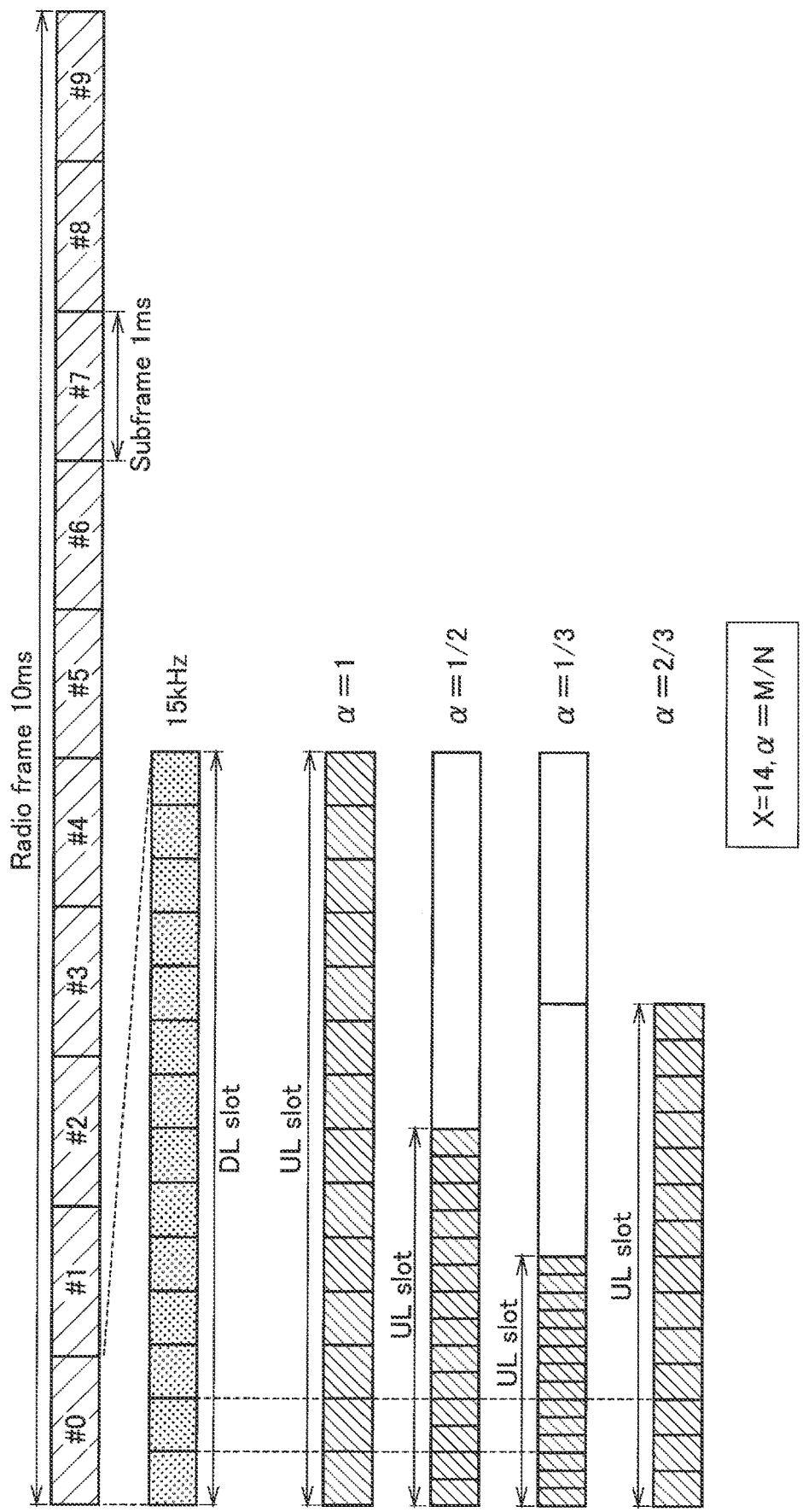
FIG. 8 is a diagram illustrating a configuration example 1-4 of the radio frame.

FIG. 4 is a schematic functional block diagram of the gNB 100 and the UE 200. Since the gNB 100 and the UE 200 have a similar schematic functional block configuration, the description will be made below with a functional block of the UE 200 as an example.

As mentioned above, in the radio communication system 10, the DFT-S-OFDM (applicable to both the downlink (DL) and the uplink (UL)) and the FTN are applicable. The DFT-S-OFDM in particular, is preferable from a viewpoint of securing the PAPR.

The limited number of RF chains can degrade the SE; however, in the FTN it is possible to improve the SE by using a waveform squeezed in the time direction.

It is to be noted that the schematic functional block diagram shown in FIG. 4 indicates mainly a portion related to the FTN and the DFT-S-OFDM. In FIG. 4, the related function block is indicated by dividing into a transmission side and a reception side.

On the transmission side, because the DFT-S-OFDM is used, after modulation with a modulation method selected, DFT precoding is performed, and mapping of subcarrier is performed on a signal. The subcarrier is a sine wave having a different carrier frequency, and a phase and an amplitude of each subcarrier are set according to a type of the symbol transmitted. Here, application of the FTN is taken into consideration, and an intensive mapping of a subcarrier of a low frequency is performed.

Thereafter, an inverse fast Fourier transform (IFFT) is performed on the plurality of symbols, and a time signal sequence is output. The plurality of symbols input is transmitted in parallel by separate carriers. Moreover, a cyclic prefix (CP) is added to the OFDM signal after the IFFT.

On the transmission side, at a stage subsequent to the CP addition, that is, after the DFT-S-OFDM, FTN modulation module is provided.

The FTN modulation module, in accordance with the FTN, multiplexes the OFDM symbol at a rate faster than the Nyquist rate. Specifically, the FTN modulation module has a waveform forming function after an up-sampling and the aforementioned sampling.

On the reception side, a processing opposite to that on the transmission side mentioned above is performed. On the reception side, a frequency-domain equalization (FDE) function based on a minimum mean-square error (MMSE) is mounted. Accordingly, equalizing of the frequency-domain based on the MMSE is performed, and it is possible to improve the BER characteristics.

Specifically, a combination of the FTN and the DFT-S-OFDM using the FDE is capable of improving the SE that the DFT-S-OFDM alone, while sacrificing an appropriate increase in a signal-to-noise ratio (SNR). Moreover, the combination of the FTN and the DFT-S-OFDM using the FDE is capable of achieving a performance of the BER and SE similar to that in a case in which a CP-OFDM is used.

Moreover, on the reception side, at a stage prior to CP elimination, FTN demodulation module is provided. The FTN demodulation module has a matched filter (matched filter), a down-sampling function, and the like.

The FTN modulation module and the FTN demodulation module transmit and receive a slot that is formed by a plurality of symbols (specifically, may be called as OFDM symbol or FTN symbol as it is subsequent to the FTN). In the present embodiment, the FTN modulation module and the FTN demodulation module form a transmitting and receiving unit.

The slot is, as described later, a range (period) in the time direction (may be called as time domain) included in the radio frame. In the present embodiment, a 14-symbol/slot is supported; however, a slot including symbols whose number is an integral multiple of 14 may be supported.

The control unit is capable of determining the number of symbols included in the slot, on the basis of the time length of the symbol, that is, a relationship of a time length of the slot and the time length of the symbol.

Specifically, the control unit is capable of determining the number of symbols included in the sub-frame on the basis of the symbol having the time length squeezed due to the FTN.

More specifically, the control unit may determine the number of symbols included in the sub-frame according to the degree of modulation of the FTN at which the time length of the symbol varies. Here, the degree of modulation of the FTN may be the abovementioned FTN modulation factor $\alpha$ (for example, 0.5) or an FTN limit (Table 1). Or, if it is a value that can determine the degree of squeezing in a time direction of the symbol by the FTN, it may be other than $\alpha$ or the FTN limit.

Moreover, the control unit may determine the number of symbols included in the sub-frame on the basis of a factor associated with the degree of modulation, for example, the abovementioned FTN modulation factor $\alpha$.

Or, the control unit may determine the time length of the slot on the basis of the degree of modulation of the FTN. Specifically, the control unit is capable of changing the time length of the slot (slot period) on the basis of a value of the FTN modulation factor $\alpha$. For instance, the control unit may shorten the time length of the slot as much as the value of $\alpha$ becomes small.

Moreover, in the present embodiment, the control unit is capable of determining the number of symbols included in the sub-frame by applying a reference number of the symbol in the slot or an integral multiple of the reference number. Specifically, the reference number is 14, and 28, 56, 112 ($14*2^n$) can be used. However, as it will be described later, the reference number is not restricted to 14.

In the present embodiment, the control unit is capable of determining the number of symbols included in the slot on the basis of a sub-carrier spacing used in transmission and reception of the slot. Specifically, the control unit is capable of determining the number of symbols included in the slot on the basis Sub-Carrier Spacing (SCS), for example, 15 kHz, 30 kHz and the like, that is applied to the radio communication system 10. Note that, even wider such as 120 kHz and 240 kHz, moreover, 480 kHz and 960 kHz may be included in the SCS.

Note that, the UE 200, for performing the radio communication according to the NR, supports a processing related to stipulated reference signal, control signal, control channel, and data channel.

The US 200, for example, executes processing by using reference signals (RS) such as Demodulation reference signal (DMRS) and Phase Tracking Reference Signal (PTRS).

DMRS is a known reference signal (pilot signal) for estimating a fading channel used for data demodulation between a base station specific for a terminal and the terminal. PTRS is a terminal-specific reference signal for the purpose of estimating phase noise which is an issue in the high frequency band.

The reference signal includes, apart from DMRS and PTRS, Channel State Information-Reference Signal (CSI-RS) and Sounding Reference Signal (SRS).

Moreover, the UE 200 transmits and receives a control signal of the radio resource control layer (RRC) via the control channel.

A channel includes a control channel and a data channel. A control channel includes PDCCH (Physical Downlink Control Channel), PUCCH (Physical Uplink Control Channel), RACH (Random Access Channel, Downlink Control Information (DCI) including Random Access Radio Network Temporary Identifier (RA-RNTI)), Physical Broadcast Channel (PBCH), and the like.

A data channel includes PDSCH (Physical Downlink Shared Channel), PUSCH (Physical Downlink Shared Channel), and the like. Data means data transmitted via a data channel.

The UE 200 transmits and receives Protocol Data Unit (PDU) and Service Data Unit (SDU). Specifically, the UE 200 executes PDU/SDU assembly/disassembly and the like in multiple layers (such as medium access control layer (MAC), radio link control layer (RLC), and packet data convergence protocol layer (PDCP)).

(3) Operation of Radio Communication System

Next, an operation of the radio communication system 100 will be explained. Specifically, an operation of determining the slot configuration by the UE will be explained. Moreover, in the present embodiment, although an operation in a high frequency band such as FR4 is envisaged, it is not necessarily restricted to the operation in the high frequency band, and the frequency band may be a different frequency band including FR3 and the like, and moreover, a frequency band including FR1 and FR2.

Particularly, in a case of the high frequency band such as FR4, for instance, as a waveform that can be applied to the DL and the UL, an example such as the following may be assumed (let it be 'assumption 1') ("/" signifies 'or'. Same applies hereinafter).

DL waveform: CP-OFDM/DFT-S-OFDM/SC (Single Carrier)-FDE
UL waveform: FTN+DFT-S-OFDM/CP-OFDM/SC-FDE In such case, when the FTN+DFT-S-OFDM is applied to the UL waveform, a length of the UL symbol (OFDM symbol or FTN symbol) becomes shorter than the DL symbol in a case in which the SCS is applied. Therefore, there are cases in which it is not appropriate to apply the configuration of the radio frame of Release 15 in the 3GPP as it is, and it is preferable to change the configuration of the radio frame.

Moreover, in a case of the high frequency band such as FR4, as a waveform that can be applied to the DL and the UL, an example as the following one is assumed (let it be 'assumption 2').

DL waveform: FTN+CP-OFDM/DFT-S-OFDM/SC-FDE
UL waveform: DFT-S-OFDM/CP-OFDM/SC-FDE Even in such case, when FT+DFT-S-OFDM is applied as the DL waveform, the length of the UL symbol becomes longer than the length of the DL symbol when the same SCS is applied. Therefore, after all, there are cases in which it is not appropriate to apply the configuration of the radio frame of Release 15 of the 3GPP as it is, and it is preferable to change the configuration of the radio frame.

In such manner, configuration examples of a number of radio frames that can be used preferably, and configuration examples of the FTN associated with the FTN modulation even in a case in which the length (time length) of the UL symbol and the length (time length) of the DL symbol differ when the same SCS is applied and the cases like, will be explained below.

(3.1) Configuration Example 1 of Radio Frame

In the present configuration example, the slot is defined on the basis of the number of OFDM symbols (may as well be referred to as FTN symbol or just symbol, the same applies hereinafter).

Specifically, a definition of the radio frame and the sub-frame is similar as in Release 15. The time length (period) of the radio frame is fixed to 10 ms, and the time length of the sub-frame is to be fixed to 1 ms. However, one of or both of the time lengths may not be necessarily fixed.

FIGS. 5 to 8 show configuration examples 1-1 to 1-4 respectively of the radio frame. As shown in FIGS. 5 to 8, a slot includes x number of OFDM symbols. Here, x can be let to be 14 or a multiple of 14, such as 28, 42, 56 and the like.

Moreover, the length of the DL slot and the length of the UL slot (may be referred to as period, the same applies hereinafter) may be same or may be different.
In this case the length (period) of the DL slot and the length (period) of the UL slot may be determined according to the FTN modulation factor $\alpha$. Note that 'a' to be used in the following configuration examples may be same as the abovementioned FTN modulation index a, or may not be necessarily same as the FTN modulation factor $\alpha$, provided that it is a function of the FTN modulation factor $\alpha$.

Specifically, in the present operation example, the length of the DL symbol is same as that in Release 15. Whereas, the length of the UL symbol, as compared to that in Release 15, is scaled according to a. Moreover, the time length of at least one of the DL slot and the UL slot may change on the basis of the FTN modulation factor $\alpha$.

The configuration examples 1-1 to 1-4 have the following characteristics.

(Configuration Example 1-1): X=14, $\alpha=1/2^n$. That is, the length of the UL slot/UL symbol, and the length of the DL slot/DL symbol have a relationship $1/2^n$: 1. Here, n can be selected from a set of a number of integers.

Moreover, X is the number of UL symbols included in the UL slot and the number of DL symbols included in the DL slots. That is, in the present configuration example, for the UL and the DL, the number of symbols included in the slot is same.

(Configuration Example 1-2): X=14, α=1/N. That is, the length of the UL slot/UL symbol and the length of the DL slot/DL symbol has a relationship 1/N:1. Here, N can be selected from a set of a number of integers.

(Configuration Example 1-3): X=14, α=M/2$^n$. Here, M and n can be selected from of a set of a number of integers.

(Configuration Example 1-4): X=14, α=M/N. Similarly as the configuration example 2, M and N can be selected from a set of a number of integers.

Note that, in the present configuration example, a self-contained slot (Self-contained slot) is not supported. The Self-contained slot is a slot for which, channels (for example, PDSCH and PUCCH) in both of a UL direction and a DL direction are included in the same slot. The Self-contained slot may also be referred to as Self-contained sub-frame.

(3.2) (Configuration Example 2 of Radio Frame)

In the present configuration example, a slot is defined on the basis of an absolute period (time duration) in a specific numerology. That is, a slot is defined on the basis of time duration corresponding to a specific sub-carrier spacing (SCS).

Even in the present configuration example, similarly as the configuration example 1, definitions of the radio frame and the sub-frame are similar as in Release 15. The time length (period) of the radio frame is fixed to 10 ms, and the time length of the sub-frame is to be fixed to 1 ms.

Figure 9:
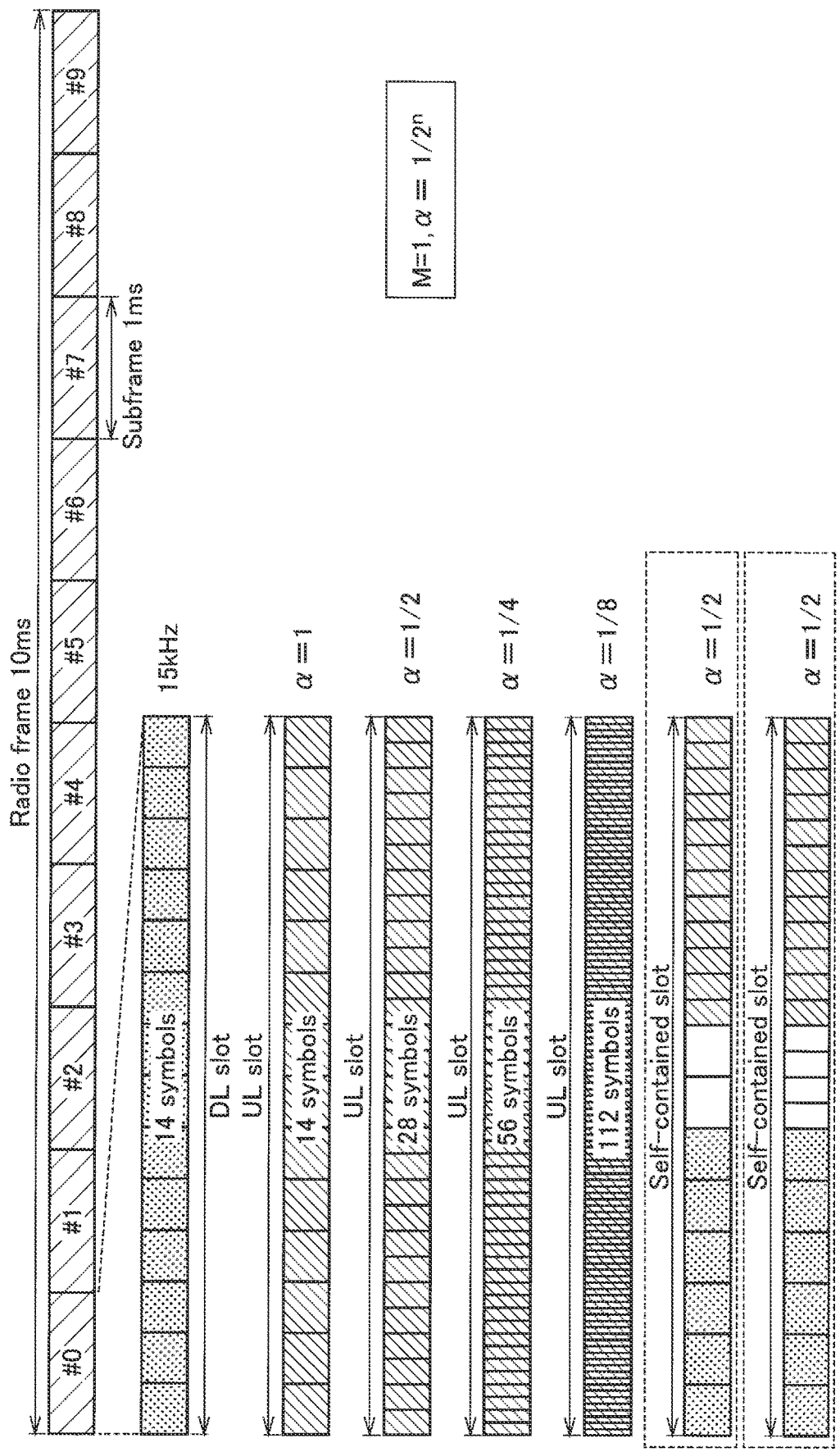
FIG. 9 is a diagram illustrating a configuration example 2-1 of the radio frame.
Figure 10:
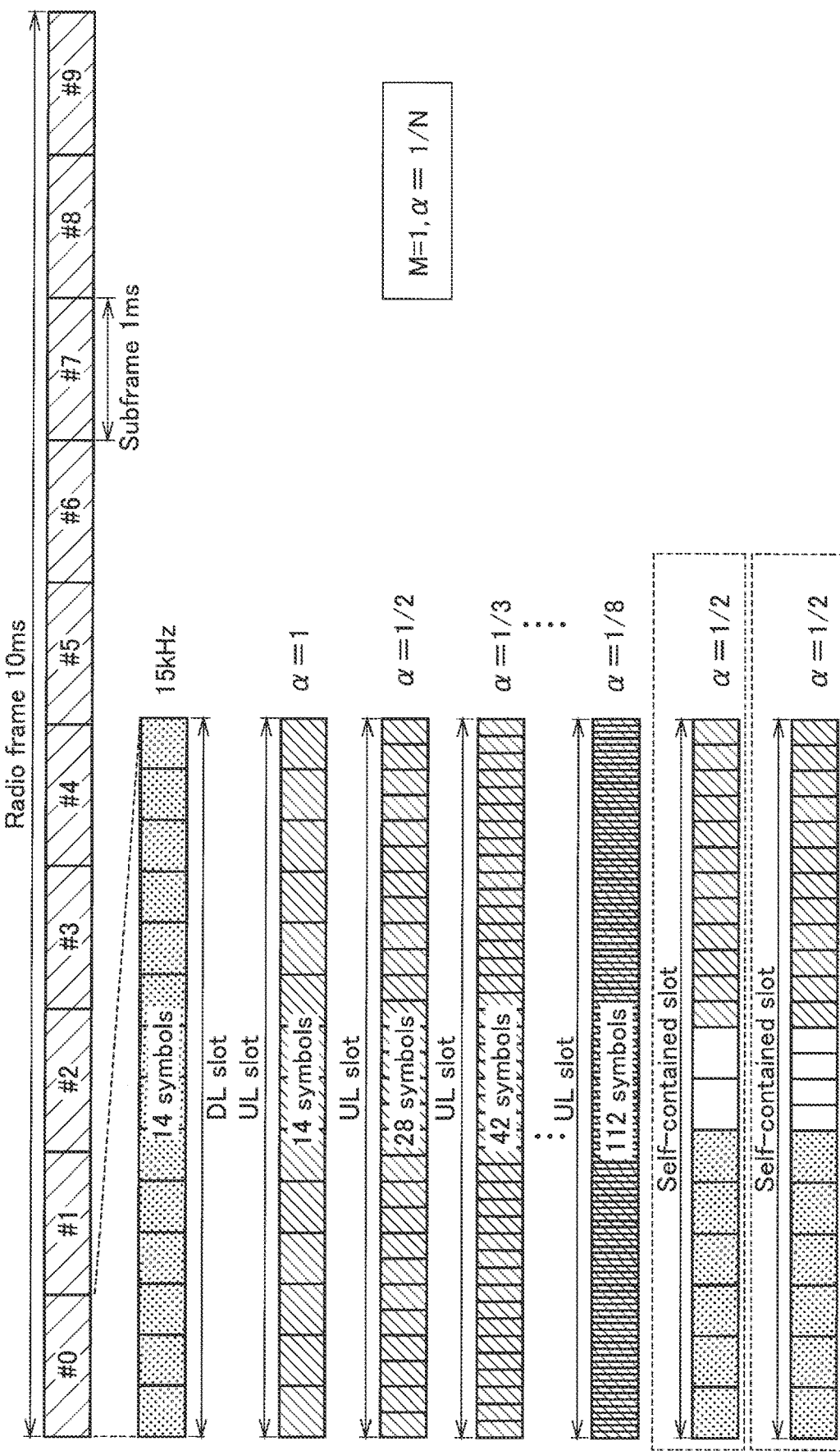
FIG. 10 is a diagram illustrating a configuration example 2-2 of the radio frame.
Figure 11:
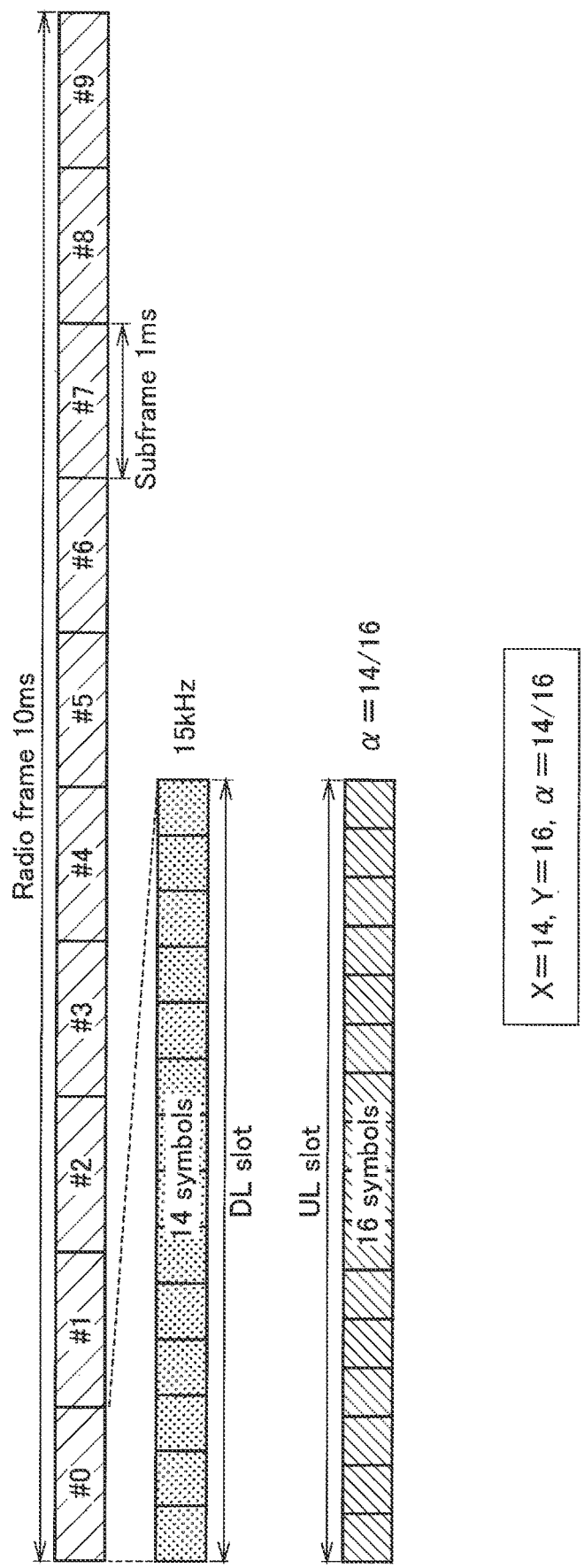
FIG. 11 is a diagram illustrating a configuration example 2-3 of the radio frame.

FIGS. 9 to 11 show configuration examples 2-1 to 2-3 of the radio frame. As shown in FIGS. 9 to 11, a slot is defined on the basis of a period corresponding to a specific SCS (in a case of 15 kHz).

In a case of sub-carrier spacing of 15*2$^k$ (k=0, 1, 2, 3, 4, 5, 6, and the like), the slot period (time length) becomes M*2$^{-k}$ (unit: ms). M is an integer that can be defined for each frequency band. The frequency band here may be a band narrower than FR or may be a band equivalent to FR (the same applies hereinafter).

It is possible to set M by signaling of an upper layer (RRC and the like) or a master information block (MIB) and a system information block (SIB). Note that, in a case of M=1, it signifies that the slot period (time length) is similar as that in Release 15.

The number of symbols included in one slot, for the DL slot and the UL slot, may be same or may be different. In this case, the number of symbols included in the slot may be determined according to the FTN modulation factor α.

Moreover, in a case of a DL-only and/or UL-only slot(s), the number of DL symbols included in the DL slot is an integer similarly as in Release 15. Whereas, the number of UL symbols included in the UL slot is scaled according to α.

The configuration examples 2-1 to 2-3 shown in FIGS. 9 to 11 have the following characteristics.

(Configuration Example 2-1): M=1, α=1/2$^n$. That is, the number of UL symbols included in the UL slot and the number of DL symbols included in the DL slot have a relationship 1:1/2$^n$. Here, n can be selected from a set of a number of integers.

(Configuration Example 2-2): M=1, α=1/N. That is, the number of UL symbols included in the UL slot and the number of DL symbols included in the DL slot have a relationship 1:1/N. Here, N can be selected from a set of number of integers.

(Configuration Example 2-3): X=14, Y=16, α=X/Y. That is, the number of UL symbols included in the UL slot and the number of DL symbols included in the DL slot have a relationship Y:X. Here, X is the DL symbols included in the DL slot, and Y is an integer greater than X.

Moreover, in a case of the present configuration example, a flexible symbol in the Self-contained slot (a symbol corresponding to a white-patch frame among dotted-line (dashed-line) frames in FIGS. 9 to 11 is defined on the basis of the number of DL symbols or the UL symbols. For instance, the flexible symbol can be defined as follows.

(Option 1): In a case in which the flexible symbol is defined on the basis of the number of DL symbols, the length of the UL symbol is scaled according to α.

(Option 2): In a case in which the flexible symbol is defined on the basis of the number of UL symbols, the length of the flexible symbol/the UL symbol is scaled according to α.

(3.3) Configuration Example 1 of FTN

In the present configuration example, the FTN modulation factor (α) is either set by the specifications of the 3GPP (NR), or can be set by signaling from the network, such as the upper layer (RRC) and the like.

In a case in which the FTN modulation factor is signaled by the RRC, a new RRC parameter is defined. For example, "FTN-modulationfactor" (tentative name) may be stipulated as a new information element (or maybe even a field). In a case in which, the parameter has not been set, the UE 200 may assume that the FTN modulation factor of default is '1' (that is, there is no squeezing of symbol in the time direction due to the FTN). The FTN modulation factor may differ for each frequency band or may be same for the plurality of frequency bands.

As to whether or not the FTN modulation is to be applied may be determined by one of the following methods.

(Explicit Method): enabling/disabling by an RRC parameter ("FTN-modulationfactor) (when the parameter has been set: FTN modulation applied, when the parameter not has not been set: FTN modulation not applied)

(Implicit Method): Any of the following options is to be applied.

(Option 1): Whether or not the RRC parameter (FTN-modulationfactor) has been set, for instance, if the FTN-modulationfactor has been set, it is determined as the FTN modulation applied.

(Option 2): Whether or not the RRC parameter (FTN-modulationfactor) is a specific value, for instance, when the FTN-modulationfactor has been set to '1', it is determined as the FTN modulation not applied, and in a case of other than '1', it is determined as the FTN modulation applied.

(Option 3): Whether or not the frequency band is a predetermined frequency (for example, xGHz) or higher, for example, in a case in which a utilization frequency band exceeds xGHz, it is determined as the FTN modulation applied.

(3.4) Configuration Example 2 of FTN

In the present configuration example, the FTN modulation is to be set as a capability of the UE 200 (terminal) by any of the following methods.

(Option 1): the FTN modulation is an indispensable capability irrespective of whether or not there is signaling of terminal capability information at least under a specific condition (for example, within a specific frequency range)

(Option 2): the FTN modulation becomes an indispensable capability due to signaling of terminal capability information at least under a specific condition (Option 3): the FTN modulation is an option due to a signaling of the terminal capability in.

In a case of option 2 and option 3, it is necessary to define signaling of the terminal capability information. Content of the signaling may differ for each frequency band or may be same for the plurality of frequency bands.

It is preferable that the terminal reports (signaling) separately or collectively for each frequency band, as to whether or not the FTN is supported in a plurality of frequency bands that differ.

Moreover, it is preferable that the terminal, in a case of supporting the FTN in the frequency bands that differ, reports separately or collectively for each frequency band, capability information related to the FTN modulation factor supported.

(3.5) Miscellaneous

The abovementioned configuration examples 1 and 2 of the radio frame are applicable to 'assumption 1' of the DL/UL waveform. Moreover, the configuration examples 1 and 2, by interchanging the DL and the UL, are also applicable to 'assumption 2' of the DL/UL waveform.

Moreover, the abovementioned configuration examples 1 and 2 of the FTN can be provided to one of 'assumption 1' and 'assumption 2' of the DL/UL waveform.

(3.6) Observations

When the abovementioned configuration examples 1 and of the radio frame are compared, in the configuration example 1, it is possible to reuse the existing channel mapping (and corresponding parameter settings) in the slot. Since the proportion occupied by the slot in the sub-frame may differ for the DL and the UL, when it is taken into consideration that the slot period may differ for the DL and the UL, it is not possible to support the Self-contained slot.

Whereas, in the configuration example 2 (excluding the configuration example 2-3), it is possible to reuse the existing time division duplex (TDD) configuration, and to make uniform the slot period of the DL and the UL. Consequently, it is possible to support the Self-contained slot. However, it is necessary to redesign the existing channel mapping (and the corresponding parameter settings).

Moreover, when the configuration examples 1-1 to 1-4 are compared, in the configuration examples 1-1 and 1-2, a point that the existing TDD configuration can be reused is beneficial, but there are some restrictions on candidate values of $\alpha$. In the configuration example 1-2, it is possible to determine the value of a more flexibly than in the configuration example 1-1. In the configuration examples 1-3 and 1-4, a point that the value of a can be determined flexibly is beneficial, but since the length of the plurality of UL symbols is not uniform with the length of one DL symbol, the existing TDD configuration cannot be reused.

Moreover, when the configuration examples 2-1 to 2-3 are compared, in the configuration examples 2-1 and 2-2, when the flexible values of a are restricted, the existing TDD configuration can be reused. For example, the maximum value of a is 0.5 (excluding $\alpha=1$). In the configuration example 2-2, it is possible to determine the value of a more flexibly than in the configuration example 2-1.

Whereas, in the configuration example 2-3, it is possible to provide the optimum flexibility regarding the value of a. That is, a can take an arbitrary value smaller than 1. However, in the configuration example 2-3, since the length of the plurality of UL symbols is not uniform with the length of one DL symbol in some cases, the existing TDD configuration cannot be used.

(4) Advantageous Effects

As explained above, according to the present embodiment, the following advantageous effects are achieved. Specifically, according to the UE 200 (and the gNB 10, same applies hereinafter), it is possible to determine the number of symbols (may be referred to as OFDM symbols or FTN symbols), on the basis of the time length of the symbol (length of the symbol, symbol period).

Consequently, even in a case in which the Faster-Than-Nyquist (FTN) is applied, and the time length of the symbol is squeezed, it is possible to use an appropriate configuration of the radio frame.

In the present embodiment, the UE 200 is capable of determining the number of symbols included in the sub-frame according to the degree of modulation of the FTN at which the time length of the symbol varies, specifically, the FTN modulation factor $\alpha$. Consequently, it is possible to use more appropriate configuration of the radio frame according to the degree of modulation (extent of squeezing of the time length) of the FTN.

In the present embodiment, the UE 200 is capable of applying the reference number (for example, 14) of the symbol in the slot or the integral multiple of the reference number, and determining the number of symbols included in the sub-frame. Consequently, even in the case in which the FTN is applied, it is possible to use more appropriate configuration of the radio frame while reusing the existing TDD configuration.

In the present embodiment, the UE 200 is capable of determining the number of symbols included in the slot on the basis of the sub-carrier spacing (SCS) used for the transmission and reception of slots. Consequently, even in the case in which the FTN is applied, it is possible use even more appropriate configuration of the radio frame according to the sub-carrier spacing.

(5) Other Embodiments

Although the contents of the present invention have been described by way of the embodiments, it is obvious to those skilled in the art that the present invention is not limited to what is written here and that various modifications and improvements thereof are possible.

For instance, in the abovementioned embodiment, although the explanation to the effect that it is possible to apply in particular, to a high frequency band of FR4, that is the frequency band exceeding 52.6 GHz has been made, at least any one of the abovementioned configuration examples of the radio frame may be applied to other frequency range such as FR3.

Furthermore, as explained above, FR4 may be divided into a frequency range of 70 GHz or lower, and a frequency range of 70 GHz or higher, and the correspondence between the proposal and the frequency range such as, (Proposal 1)

to (Proposal 3) are applied to the frequency range of 70 GHz and higher, and the proposals are applied partially to the frequency range of 70 GHz and lower, may be changed as deemed appropriate.

Moreover, the block diagram used for explaining the embodiments (FIG. 4) shows blocks of functional unit. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as explained above, the realization method is not particularly limited to any one method.

Figure 12:
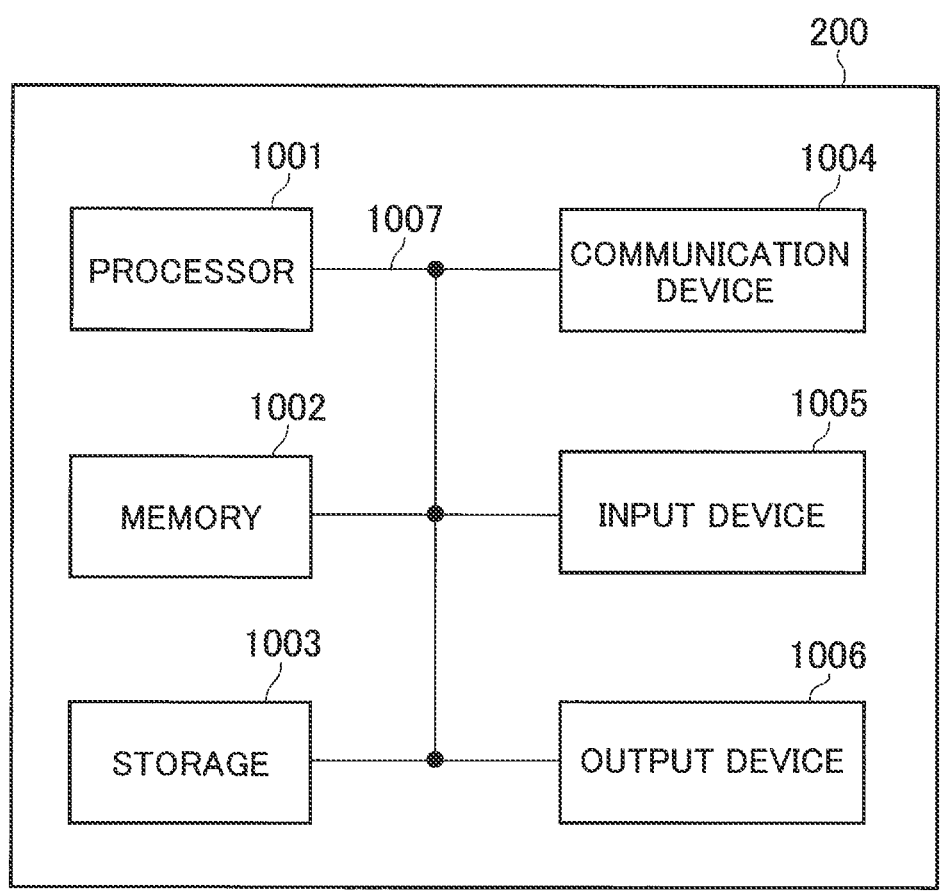
FIG. 12 is a diagram illustrating an example of a hardware configuration of the UE 200.

Furthermore, the UE 200 explained above can function as a computer that performs the processing of the radio communication method of the present disclosure. FIG. is a diagram illustrating an example of a hardware configuration of the UE 200. As shown in FIG. 12, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the UE 200 (see FIG. 4) can be realized by any of hardware elements of the computer device or a desired combination of the hardware elements.

Moreover, the processor 1001 performs computing by loading a predetermined software (computer program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a computer program (computer program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, notification information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station. A radio frame may be composed of one or more frames in the time domain. Each frame or frames in the time domain may be referred to as a subframe.

A subframe may be further configured by one or more slots in the time domain. The subframe may have a fixed time length (e.g., 1 ms) that does not depend on the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in a time unit larger than a minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one between a subframe and TTI may be a subframe (1 ms) in existing LTE, or may be shorter than 1 ms (for example, 1 to 13 symbols), or a period longer than 1 ms. Note that, a unit representing TTI may be called a slot, a minislot, or the like instead of a subframe.

Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. Further, the number of slots (the number of minislots) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the numerology. The number of subcarriers included in the RB may be determined based on the numerology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain numerology in a certain carrier. Here, a common RB may be specified by RB index based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. In other words, "judgement" and "decision" may include considering some operation as "judged" and "decided". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
1001 Processor
1002 Memory
1003 Storage
1004 Communication device
1005 Input device
1006 Output device
1007 Bus

The invention claimed is:

1. A terminal comprising:
   a transmitting and receiving unit that transmits and receives a slot including a plurality of symbols; and
   a control unit that determines number of symbols included in a sub-frame on the basis of a time length of the symbol, wherein
   the control unit determines the number of symbols included in the sub-frame according to a degree of modulation at which the time length of the symbol varies.

2. The terminal as claimed in claim 1, wherein the control unit determines the number of symbols included in the sub-frame on the basis of a factor associated with the degree of modulation.

3. The terminal as claimed in claim 1, wherein the control unit determines a time length of the slot on the basis of the degree of modulation.

4. The terminal as claimed in claim 1, wherein the control unit applies a reference number of the symbol in the slot or an integral multiple of the reference number, and determines the number of symbols included in the sub-frame.

5. The terminal as claimed in claim 1, wherein the control unit determines the number of symbols included in the slot on the basis of a sub-carrier spacing used for transmission and reception of the slot.

6. The terminal as claimed in claim 2, wherein the control unit determines a time length of the slot on the basis of the degree of modulation.

7. The terminal as claimed in claim 2, wherein the control unit applies a reference number of the symbol in the slot or an integral multiple of the reference number, and determines the number of symbols included in the sub-frame.

8. The terminal as claimed in claim 3, wherein the control unit applies a reference number of the symbol in the slot or an integral multiple of the reference number, and determines the number of symbols included in the sub-frame.

9. The terminal as claimed in claim 2, wherein the control unit determines the number of symbols included in the slot on the basis of a sub-carrier spacing used for transmission and reception of the slot.

\* \* \* \* \*